(12) United States Patent
Folchnandt et al.

(10) Patent No.: US 12,364,990 B2
(45) Date of Patent: Jul. 22, 2025

(54) MySx/ZSH MIXTURE AS SULFIDIZING AGENT

(71) Applicant: NOURYON CHEMICALS INTERNATIONAL B.V., Arnhem (NL)

(72) Inventors: Matthias Folchnandt, Cologne (DE); Olaf Klobes, Greiz (DE); Ulises Picardi, El Prat de Llobregat (ES); Rodrigo M. Giménez, Santiago (CL); Leandro Prats, Santa Fe (AR)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 310 days.

(21) Appl. No.: 17/643,477

(22) Filed: Dec. 9, 2021

(65) Prior Publication Data
US 2022/0184630 A1 Jun. 16, 2022

(30) Foreign Application Priority Data
Dec. 10, 2020 (EP) .................................. 20383076

(51) Int. Cl.
*B03D 1/04* (2006.01)
*B03B 1/04* (2006.01)
(Continued)

(52) U.S. Cl.
CPC ............... *B03B 1/04* (2013.01); *B03D 1/002* (2013.01); *C01B 17/22* (2013.01); *B03D 1/008* (2013.01);
(Continued)

(58) Field of Classification Search
CPC ...................... B03D 2201/02; B03D 2203/025
See application file for complete search history.

(56) References Cited

U.S. PATENT DOCUMENTS 2,811,255 A * 10/1957 Nokes .................... B03D 1/002
209/167
4,684,459 A * 8/1987 Klimpel ................. B03D 1/014
558/252
(Continued)

FOREIGN PATENT DOCUMENTS

CA 2782436 A1 * 6/2011 ............ B03D 1/002
CL 201800471 A 5/2018
(Continued)

OTHER PUBLICATIONS

Le-ming Ou, Bing-yi Yin; A Floatation Technique for a Sulfide-Oxidized Cu-Co Mixed Ore; Nov. 22, 2011; Advanced Materials Research; ISSN 1662-8985, vol. 402, pp. 564-571 (Year: 2011).*
(Continued)

*Primary Examiner* — Clare M Perrin
(74) *Attorney, Agent, or Firm* — Lorenz & Kopf, LLP (57) ABSTRACT

The disclosure is directed to a sulfidizing agent obtainable by mixing $M_yS_x$ and ZSH in a weight ratio of from about 90:10 to about 10:90, wherein M is chosen from $Li^+$, $Na^+$, $K^+$, $Rb^+$, $Cs^+$, $NH_4^+$, $Mg^{2+}$ and $Ca^{2+}$, y is about 1 or about 2, x is from about 1.1 to about 5, and Z is independently chosen from $Li^+$, $Na^+$, $K^+$, $Rb^+$, $Cs^+$ and $NH_4^+$, and a process for using the sulfidizing agent in the recovery of one or more metal ores and/or polymetallic minerals from gangue.

18 Claims, 4 Drawing Sheets

(51) Int. Cl.
  *B03D 1/002* (2006.01)
  *C01B 17/22* (2006.01)
  *B03D 1/008* (2006.01)
  *B03D 1/012* (2006.01)
  *B03D 1/014* (2006.01)
  *B03D 1/018* (2006.01)
  *C02F 1/24* (2023.01)

(52) U.S. Cl.
  CPC .............. *B03D 1/012* (2013.01); *B03D 1/014* (2013.01); *B03D 1/018* (2013.01); *B03D 2201/02* (2013.01); *B03D 2203/025* (2013.01); *C02F 1/24* (2013.01)

(56) References Cited

U.S. PATENT DOCUMENTS

| | | | |
|---|---|---|---|
| 2013/0025410 A1* | 1/2013 | Saez Navarrete | B03D 1/02 75/770 |
| 2019/0256950 A1* | 8/2019 | Horn | C22B 15/0008 |

FOREIGN PATENT DOCUMENTS

| | | | | | |
|---|---|---|---|---|---|
| CN | 107790292 A | * | 3/2018 | | |
| CN | 111530636 A | * | 8/2020 | | |
| JP | 2009202065 A | * | 9/2009 | | |
| JP | 2010285639 A | * | 12/2010 | | |
| WO | WO-2015157498 A1 | * | 10/2015 | ............. | B03D 1/002 |

OTHER PUBLICATIONS

Wikipedia—http://en.wikipedia.org/wiki/Sodium_polysulfide Aug. 24, 2023 (Year: 2023).*
Osserov et al. (Non-ferrous Metals, 2017, 2, 3-8). (Year: 2017).*
Machine translation of CN-111530636-A., pp. 1-9. (Year: 2020).*
Extended European Search Report dated May 10, 2022, issued in respect of European Patent Application No. EP21210991.2.

* cited by examiner

MySx/ZSH MIXTURE AS SULFIDIZING AGENT

CROSS REFERENCE TO RELATED APPLICATION

This application claims priority to European Patent Application No. 20383076.5, filed Dec. 10, 2020, the entire content of which is incorporated by reference herein.

TECHNICAL FIELD

This disclosure relates to a $M_yS_x$/ZSH mixture as sulfidizing agent and a process for using the same in the recovery of one or more metal ores and/or polymetallic minerals from gangue.

BACKGROUND

Currently, there are two main metallic extraction processes used in mining to recover metal ores and/or polymetallic minerals from gangue. If the ore/mineral is in its oxidised form (i.e., minerals formed by the bond between metals and metalloids with oxygen), recovery is generally through leaching, while froth floatation is generally used for metallic sulfides.

The process of leaching extracts a species of interest from a mineral sample by use of reagents that dissolve or transform the species into soluble salts. Thus, in leaching, useful species are recovered from a liquid phase, corresponding to the substance or a salt thereof in aqueous solution. However, leaching processes require a high working acidity and, in some cases, produce toxic residual effluents. Leaching processes can also suffer lower efficiency, due to low temperatures of operation, which dramatically affect the rates of chemical reaction.

Separation by froth flotation is based on the ability of air bubbles to selectively attach to those particles that were previously rendered hydrophobic. The particle-bubble combinations then rise to the froth phase from where the flotation cell is discharged, whilst the hydrophilic particles remain in the flotation cell. Particle hydrophobicity is, in turn, induced by special chemicals called collectors. In direct flotation systems, it is the economically valuable minerals which are rendered hydrophobic by the action of the collector. Similarly, in reverse flotation systems, the collector renders hydrophobicity to those mineral particles considered waste. The efficiency of the separation process is quantified in terms of recovery and grade. Recovery refers to the percentage of valuable product contained in the ore that is removed into the concentrate stream after flotation. Grade refers to the percentage of the economically valuable product in the concentrate after flotation. A higher value of recovery or grade indicates a more efficient flotation system.

Besides collectors, foaming agents (or frothers) can also be used in a froth flotation process. Foaming agents have three main functions, namely, they aid formation and preservation of small bubbles, they reduce bubble rise velocity and they aid formation of froth. In this sense they have a completely different role from collectors, which generally need to impart lipophilicity to minerals in order to float them. Surfactants achieve this by adsorbing onto mineral surfaces rendering them water repellent, reducing the stability of the hydrated layer separating the mineral from the air bubble to such a level that attachment of the particle to the bubble can be made. For this reason, foaming agents are exemplified by needing to have a much lower log P (partition-coefficient) value than collector components, or to say it in other words, foaming agents are generally much more hydrophilic than collectors.

A problem faced by many mines, is that they have a combination of sulfide and oxide ores. Thus, they must decide if they process the mixture through flotation, increasing the oxide losses, or process through leaching, where they lose some of the sulfide content. In copper mining, for example, oxidized and sulfurized ores are found mixed in many different proportions. The most common oxidized copper or oxide minerals are carbonates (malachite and azurite), sulfates (brochantite and antlerite), and oxychloride (atacamite and chrysocolla hydrated silicate), while the most common sulphide copper minerals are chalcopyrite ($CuFeS_2$), bornite ($Cu_5FeS_4$), chalcosine ($Cu_2S$), covelin (CuS) and enargite ($Cu_3AsS_4$).

It is traditional for copper mines to recover metal ores and/or polymetallic minerals from gangue using froth flotation. In some cases, "sulfidization" is used as an important tool to improve recovery of some of the oxides. Here, a sulfidizing agent, such as sodium hydrogen sulfide (NaSH), is added during froth flotation or just before the milled mineral pulp is fed into the flotation cells, in order to produce a sulfide-metal layer on an oxidized ore or mineral surface, to allow the sulfide collectors to attach to the mineral surface and cause the mineral particles to be hydrophobic, so that they can be recovered by normal sulfide flotation (i.e., direct flotation).

The advantage of this process is that it allows recovery of important amounts of metal that otherwise would be lost, without need of investing in new plants and equipment, since the only difference to traditional flotation is that the sulfidizing agent is added to the process.

In case of sodium hydrogen sulfide, doses greater than 100 g/ton of mineral must be used to obtain good results. However, overdosing of sodium hydrogen sulfide results in an adverse depressant effect, which causes the metal to be recovered not to float and to be lost in the tailings. In addition, the use of sodium hydrogen sulfide is associated with handling issues, due to potential $H_2S$ emissions.

Accordingly, there is a need to provide improved sulfidizing agents and processes, that have good recovery yields, and which cause reduced depressant effects and $H_2S$ emissions.

BRIEF SUMMARY

This disclosure provides a sulfidizing agent obtained by mixing $M_yS_x$ and ZSH in a weight ratio of from about 90:10 to about 10:90, wherein M is chosen from $Li^+$, $Na^+$, $K^+$, $Rb^+$, $Cs^+$, $NH_4^+$, $Mg^{2+}$ and $Ca^{2+}$, y is about 1 or about 2, x is from about 1.1 to about 5, and Z is independently chosen from $Li^+$, $Na^+$, $K^+$, $Rb^+$, $Cs^+$ and $NH_4^+$.

This disclosure also provides a process for recovering one or more metal ores and/or polymetallic minerals from gangue, said process comprising:
(i) treating the one or more metal ores and/or polymetallic minerals with a sulfidizing agent; and
(ii) separating the treated metal ores and/or polymetallic minerals using a sulfide floatation process;

wherein the sulfidizing agent is obtained by mixing $M_yS_x$ and ZSH in a weight ratio of from about 90:10 to about 10:90, wherein M is chosen from $Li^+$, $Na^+$, $K^+$, $Rb^+$, $Cs^+$, $NH_4^+$, $Mg^{2+}$ and $Ca^{2+}$, y is about 1 or about 2, x is from about 1.1 to about 5, and Z is independently chosen from $Li^+$, $Na^+$, $K^+$, $Rb^+$, $Cs^+$ and $NH_4^+$.

BRIEF DESCRIPTION OF THE DRAWINGS

The present disclosure will hereinafter be described in conjunction with the following drawing Figures, wherein like numerals denote like elements, and.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

In a first aspect, the disclosure provides a sulfidizing agent obtainable by mixing $M_yS_x$ and ZSH in a weight ratio of from about 90:10 to about 10:90, wherein M is chosen from $Li^+$, $Na^+$, $K^+$, $Rb^+$, $Cs^+$, $NH_4^+$, $Mg^{2+}$ and $Ca^{2+}$, y is about 1 or about 2, x is from about 1.1 to about 5, and Z is independently chosen from $Li^+$, $Na^+$, $K^+$, $Rb^+$, $Cs^+$ and $NH_4^+$.

Advantageously, sulfidizing agents prepared by mixing $M_yS_x$ and ZSH in accordance with the first aspect of the disclosure have been found to provide superior or similar recovery yields to NaSH, while exhibiting a very low depressant effect and significantly reduced $H_2S$ emissions. These advantages lead to an improvement in safety and means that dosing does not have to be continuously adjusted in order to avoid depressing the mineral. The mixtures also allow for lower amounts of the sulfidizing agent to be used, thus minimizing the amounts of reagents consumed.

Furthermore, use of a sulfidizing agent in accordance with the first aspect of the disclosure does not require plant modification and/or installation of additional equipment, such as cells (i.e., floatation cells).

In a second aspect, the disclosure provides a process for recovering one or more metal ores and/or polymetallic minerals from gangue, the process comprising:
  (i) treating the one or more metal ores and/or polymetallic minerals with a sulfidizing agent; and
  (ii) separating the treated metal ores and/or polymetallic minerals using a sulfide floatation process;
wherein the sulfidizing agent is obtainable by mixing $M_yS_x$ and ZSH in a weight ratio of from about 90:10 to about 10:90, wherein M is chosen from $Li^+$, $Na^+$, $K^+$, $Rb^+$, $Cs^+$, $NH_4^+$, $Mg^{2+}$ and $Ca^{2+}$, y is 1 or 2, x is from about 1.1 to about 5, and Z is independently chosen from $Li^+$, $Na^+$, $K^+$, $Rb^+$, $Cs^+$ and $NH_4^+$.

This process provides a safer, quicker, less costly and more reliable route for recovering one or more metal ores and/or polymetallic minerals from gangue, including from a copper mine. In particular, the process increases the performance of a selective sulfide flotation process by sulfidizing at least a portion of oxidised metal ores and/or polymetallic minerals contained in the gangue that would otherwise not be recovered.

As indicated above, the present disclosure is directed to a sulfidizing agent obtainable by mixing $M_yS_x$ and ZSH in a weight ratio of from about 90:10 to about 10:90, wherein M is chosen from $Li^+$, $Na^+$, $K^+$, $Rb^+$, $Cs^+$, $NH_4+$, $Mg^{2+}$ and $Ca^{2+}$, y is about 1 or about 2, x is from about 1.1 to about 5, and Z is independently chosen from $Li^+$, $Na^+$, $K^+$, $Rb^+$, $Cs^+$ and $NH_4^+$.

Preferably, x has a value of from about 1.1 to about 4.5, preferably of from about 2.1 to about 4, and more preferably of from about 3 to about 4. In order to obtain the highest sulfur content while maintaining good stability, x preferably has a value of 4.

M and/or Z is preferably $Li^+$, $Na^+$, $K^+$, $Rb^+$ or $Cs^+$, more preferably $K^+$ or Na and most preferably $Na^+$. In a preferred embodiment, $M_yS_x$ is $Na_2S_4$ and/or ZSH is NaSH.

$M_yS_x$ and ZSH may be mixed in a weight ratio of from about 90:10 to about 10:90, preferably of from about 90:10 to about 30:70, more preferably of from about 90:10 to about 50:50 and most preferably of from about 70:30 to about 50:50.

When $M_yS_x$ is mixed with ZSH to prepare the sulfidizing agent of the disclosure, a new polysulfide ($M_yS_x$) composition is formed, wherein the value of x varies depending on the weight ratio of the $M_yS_x$/ZSH mixture used. For example, when NaSH is mixed with $Na_2S_4$, the NaSH effectively reduces the x value of $Na_2S_4$ from about 4, forming a new polysulfide composition having an average value of x that depends on the weight ratio of NaSH/$Na_2S_4$ mixture used. This dependency of x on the weight ratio is quantified in the below table:

| Mixing ratio NaSH/$Na_2S_4$ | resulting x value |
| --- | --- |
| about 10:about 90 | about 3.25 |
| about 30:about 70 | about 2.23 |
| about 50:about 50 | about 1.67 |
| about 70:about 30 | about 1.23 |

This variation in resulting x values means that by mixing $M_yS_x$ and ZSH at different weight ratios, the sulfidizing agent of the present disclosure can be tailored to the requirements of an individual mine.

When the sulfidizing agent of the disclosure is used to aid recovery of one or more metal ores and/or polymetallic minerals in a sulfide floatation process, a collector, and optionally a foaming agent, is required to separate the sulfidized metal ores/polymetallic minerals by floatation, as described above. Thus, when used with a collector and optional foaming agent, the sulfidizing agent of the disclosure is a promoter of oxidized metals and the combination is able to increase the performance of a selective sulfide flotation process by sulfidizing and floating at least a portion of oxidised metal ores and/or polymetallic minerals contained in the gangue that would otherwise not be recovered.

The sulfidizing agent may include at least one collector. Preferably, the at least one collector is a monothiophosphate or dithiophosphate collector. Suitable monothiophosphate collectors include sodium diethyl monothiophosphate, sodium di-sec-butyl monothiophosphate, sodium diisobutyl monothiophosphate and sodium diisoamyl monothiophosphate. Suitable dithiophosphate collectors include monoalkyl dithiophosphates, such as sodium ethyl dithiophosphate, sodium propyl dithiophosphate, sodium isopropyl dithiophosphate, sodium butyl dithiophosphate, sodium sec-butyl dithiophosphate, and sodium isobutyl dithiophosphate, dialkyl dithiophosphates, such as sodium diethyl dithiophosphate, sodium di-sec-butyl dithiophosphate, sodium diisobutyl dithiophosphate, and sodium diisoamyl dithiophosphate, and diaryl dithiophosphates, such as sodium dicresyl dithiophosphate. The sulfidizing agent may include a mixture of two or more monothiophosphate and/or dithiophosphate collectors.

When included, the at least one collector may be present in the sulfidizing agent in an amount of from about 1 to about 20 wt %, more preferably from about 5 to about 10 wt %, based on the total weight of the sulfidizing agent. In particular, the sulfidizing agent may comprise a mixture of $M_yS_x$, ZSH and collector in a weight ratio of ($M_yS_x$ and ZSH):collector of from about 99:1 to about 80:20, more preferably of from about 95:5 to about 90:10. In particular embodiments, the sulfidizing agent may comprise a mixture of $M_yS_x$, ZSH and collector in a weight ratio of from about 50:50:0 to about 40:40:20, preferably of from about 49:49:2 to about 47:47:6.

The sulfidizing agent may include at least one foaming agent. The at least one foaming agent may be chosen from phenols, alkyl sulfates, aliphatic alcohols, generally C5-C8 cyclic alcohols, alkoxyalkanes, polypropylene glycol ethers, polyglycol ethers, polyglycol glycerol ethers, pyridine base, natural oils such as terpineol (pine oil) and cresols, mixed ethers, aldehydes and ketone co-products of oxo alcohol production, and ethoxylated alcohols. Preferably, the at least one foaming agent is a polyglycol, for example, a polypropylene glycol ether, a polyglycol ether or a polyglycol glycerol ether. The sulfidizing agent may include a mixture of two or more foaming agents.

When included, the at least one foaming agent may be present in the sulfidizing agent in an amount of from about 1 to about 20 wt %, more preferably from about 5 to about 10 wt %, based on the total weight of the sulfidizing agent. In particular, the sulfidizing agent may comprise a mixture of $M_yS_x$, ZSH and at least one foaming agent in a weight ratio of ($M_yS_x$ and ZSH):foaming agent of from about 99:1 to about 80:20, more preferably of from about 95:5 to about 90:10. In particular embodiments, the sulfidizing agent may comprise a mixture of $M_yS_x$, ZSH and foaming agent in a weight ratio of from about 50:50:0 to about 40:40:20, preferably of from about 49:49:2 to about 47:47:6.

As explained above, when the sulfidizing agent contains a collector and/or a foaming agent, it becomes a promoter of oxidized metals. Furthermore, inclusion of a collector and/or a foaming agent into the sulfidizing agent streamlines any dosing to a sulfide floatation process, and substantially reduces storage requirements. When both a collector and foaming agent are included, the sulfidizing agent may comprise a mixture of $M_yS_x$, ZSH, collector and foaming agent in a weight ratio of ($M_yS_x$ and ZSH):collector:foaming agent of from about 98:1:1 to about 60:20:20, more preferably of from about 90:5:5 to about 80:10:10. In a preferred embodiment, the sulfidizing agent comprises a mixture of $M_yS_x$, ZSH, collector and foaming agent in a weight ratio of from about 49:49:1:1 to about 35:35:15:15, and more preferably of from about 45:45:5:5 to about 40:40:10:10.

The present disclosure is further directed to a process for recovering one or more metal ores and/or polymetallic minerals from gangue, the process comprising:
(i) treating the one or more metal ores and/or polymetallic minerals with a sulfidizing agent; and
(ii) separating the treated metal ores and/or polymetallic minerals using a sulfide floatation process;

wherein the sulfidizing agent is obtainable by mixing $M_yS_x$ and ZSH in a weight ratio of from about 90:10 to about 10:90, wherein M is chosen from $Li^+$, $Na^+$, $K^+$, $Rb^+$, $Cs^+$, $NH_4^+$, $Mg^{2+}$ and $Ca^{2+}$, y is about 1 or about 2, x is from about 1.1 to about 5, and Z is independently chosen from $Li^+$, $Na^+$, $K^+$, $Rb^+$, $Cs^+$ and $NH_4^+$.

Preferably, x has a value of from about 1.1 to about 4.5, preferably of from about 2.1 to about 4, and more preferably of from about 3 to about 4. In order to obtain the highest sulfur content while maintaining good stability, x preferably has a value of about 4.

M and/or Z is preferably $Li^+$, $Na^+$, $K^+$, $Rb^+$ or $Cs^+$, more preferably $K^+$ or $Na^+$ and most preferably $Na^+$. In a preferred embodiment, $M_yS_x$ is $Na_2S_4$ and/or ZSH is NaSH.

$M_yS_x$ and ZSH may be mixed in a weight ratio of from about 90:10 to about 10:90, preferably of from about 90:10 to about 30:70, more preferably of from about 90:10 to about 50:50 and most preferably of from about 70:30 to about 50:50. As mentioned above, the weight ratio of $M_yS_x$ and ZSH mixture can be varied to adjust the average value of x in the resulting polysulfide composition. This means that the sulfidizing agent can be tailored to the individual requirements of any mine.

The sulfidizing agent may include at least one collector and/or at least one foaming agent. Exemplary collectors and foaming agents, and their suitable amounts are set out in relation to the first aspect of the disclosure above. Alternatively, at least one collector and/or at least one foaming agent may be added to the one or more metal ores and/or polymetallic minerals separately from the sulfidizing agent.

The process of the present disclosure is used for recovering one or more metal ores and/or polymetallic minerals from gangue. The one or more metal ores may be chosen from ores of copper (Cu), molybdenum (Mo), gold (Au), silver (Ag), lead (Pb), Nickel (Ni) and Cobalt (Co). Preferably the one or more metal ores are chosen from ores of copper, molybdenum, silver and gold, more preferably ores of copper. Examples of possible polymetallic minerals include Cu—Mo, Cu—Au, Pb—Zn—Cu, Ag—Cu, Zn—Pb—Ag, Cu—Zn—Pb—Ag, Sn—Cu and Zn—Pb minerals. Preferably, the metal ore and/or polymetallic minerals contain at least about 1 wt % of oxidized ore over the total mineral.

In step (i) of the process, the one or more metal ores and/or polymetallic minerals are treated with the sulfidizing agent. The treatment in step (i) may be performed by adding the sulfidizing agent to the one or more metal ores and/or polymetallic minerals in an amount of from about 1 to about 300 g/ton, preferably of from about 10 to about 100 g/ton, more preferably of from about 20 to about 70 g/ton, based on a dose of grams of agent per ton of dry ore/dry mineral treated.

When the sulfidizing agent includes at least one collector, treatment in step (i) may be performed by adding the sulfidizing agent to the one or more metal ores and/or polymetallic minerals in an amount of from about 1 to about 400 g/ton, preferably of from about 10 to about 130 g/ton, more preferably of from about 20 to about 90 g/ton, based on a dose of grams of agent per ton of dry ore/dry mineral treated.

When the sulfidizing agent includes at least one foaming agent, treatment in step (i) may be performed by adding the sulfidizing agent to the one or more metal ores and/or polymetallic minerals in an amount of from about 1 to about 400 g/ton, preferably of from about 10 to about 130 g/ton, more preferably of from about 20 to about 90 g/ton, based on a dose of grams of agent per ton of dry ore/dry mineral treated.

When the sulfidizing agent includes at least one collector and at least one foaming agent, treatment in step (i) may be performed by adding the sulfidizing agent to the one or more metal ores and/or polymetallic minerals in an amount of from about 2 to about 500 g/ton, preferably of from about 10 to about 160 g/ton, more preferably of from about 20 to about 100 g/ton, based on a dose of grams of agent per ton of dry ore/dry mineral treated.

The sulfidizing agent is preferably added to the one or more metal ores and/or polymetallic minerals in at least two, preferably at least three and more preferably at least four portions. The time intervals between dosing portions and/or the amount of each dosing portion may be the same or different, preferably different.

Each portion of sulfidizing agent added to the one or more metal ores and/or polymetallic minerals requires addition of at least one collector, and optionally at least one foaming agent, such that the extra "sulfidized" material yielded by the sulfidizing agent can be recovered. When the at least one collector and/or at least one foaming agent are added to the one or more metal ores and/or polymetallic minerals separately from the sulfidizing agent, the collector(s), foaming agent(s) and sulfidizing agent may be added in any order. Preferably, the at least one collector and/or at least one foaming agent are added to the one or more metal ores and/or polymetallic minerals before or at the same time as the sulfidizing agent.

Preferably, no sulfidizing agent is added to the one or more metal ores and/or polymetallic minerals before the flotation process begins. Instead, it has been found to be advantageous to delay the first addition of sulfidizing agent to the one or more metal ores and/or polymetallic minerals until at least about 1 minute, preferably at least about 2 minutes, more preferably at least about 3 minutes after the flotation process begins. Preferably, the delay is no longer than about 5 minutes and more preferably no longer than about 4 minutes.

In a preferred embodiment, a first portion of sulfidizing agent is added to the one or more metal ores and/or polymetallic minerals in a rougher flotation stage of the sulfide floatation process and a further portion of sulfidizing agent is added to the one or more metal ores and/or polymetallic minerals in at least one cleaning stage of the sulfide floatation process. Preferably, a further portion of sulfidizing agent is added to the one or more metal ores and/or polymetallic minerals in each cleaning stage of the sulfide floatation process.

In a more preferred embodiment, at least a first and a second portion of sulfidizing agent is added to the one or more metal ores and/or polymetallic minerals in the rougher flotation stage of the sulfide floatation process. In particular, at least two, three, four, six or eight portions of sulfidizing agent may be added to the rougher flotation stage of the sulfide floatation process.

When at least a first and a second portion of sulfidizing agent is added to the one or more metal ores and/or polymetallic minerals in the rougher flotation stage of the sulfide floatation process, said portions may be separated by a rougher concentrate regrinding (scavenging) stage that is downstream of the rougher floatation and upstream of the cleaning floatation. In processes with intermediate grinding (scavenging), the surface effect obtained by the sulfidizing agent is partially eliminated, and so a subsequent dose of sulfidizing agent is advantageous to recover the performance that this stage loses.

The sulfidizing agent (when free of collector and foaming agent) may be added to the rougher flotation stage and cleaning stages in amounts proportional to the solubility ratio (oxidised copper to total copper) of the ore/mineral as shown in Table A:

TABLE A

| Solubility ratio | Dosing in rougher floatation stage | Dosing in cleaning stages |
| --- | --- | --- |
| about 3 to about 10% | about 10 to about 50 g/ton | about 3 to about 8 g/ton |
| about 10 to about 20% | about 30 to about 100 g/ton | about 7 to about 12 g/ton |
| >about 20% | >about 70 g/ton | >about 15 g/ton |

As explained above, the dosing amount for each stage shown in Table A may be split into two or more portions. The amount of each dosing portion may be the same or different, preferably different.

In step (ii) of the process, the treated metal ores and/or polymetallic minerals are separated from gangue using a sulfide floatation process. Preferably, the process is a direct flotation process of the treated metal ores and/or polymetallic minerals.

More specifically, in a preferred embodiment where the sulfidizing agent does not contain a collector or a foaming agent, the process comprises the following steps:

a) mixing a ground ore/mineral with an aqueous medium to form a pulp;

b) conditioning the pulp with a collector, and optionally a foaming agent, as described above;

c) feeding the conditioned ore/mineral mixture into a rougher flotation cell;

d) introducing air into the rougher floatation cell to start the froth flotation process to recover the ore/mineral;

e) after a delay of at least 1 minute, adding a portion of the sulfidizing agent as described above to the rougher floatation cell together with additional collector and foaming agent;

f) optionally, adding a second portion of the of the sulfidizing agent along with a collector and foaming agent to the rougher flotation cell;

g) skimming off the froth formed (rougher concentrate) and feeding it into a cleaning cell; and h) adding a further portion of the sulfidizing agent along with a collector and foaming agent into the cleaning cell.

It is noted that various elements of the present disclosure, including but not limited to preferred ranges for the various parameters, can be combined unless they are mutually exclusive.

The disclosure will be elucidated by the following examples without being limited thereto or thereby.

EXAMPLES

Example 1: Recovery of Copper and Gold from Mineral Sample of Coquimbo Region, Chile Example 1 was performed using a mineral sample with the following composition:

| Sample | Total copper (%) | Oxidized copper (%) | Solubility ratio (%) | Au (g/t) | Ag (g/t) |
|---|---|---|---|---|---|
| Example 1 | 1.93 | 0.261 | 13.52 | 1.0 | 6.45 |

The Standard Flotation Protocol used was as follows:

| Parameter | Unit | |
|---|---|---|
| Flotation Machine | — | Agitair type |
| Cell volume | L | 2.7 |
| Agitation | rpm | 1100 |
| Percentage of Solids | % | 30 |
| Flotation pH | — | 10.00 (with calcium oxide) |
| Feed granulometry | | 70% through a 200 mesh (74 µm), according to ASTM E11-20 (Standard Specification for Woven Wire Test Sieve Cloth and Test Sieves, 2020) |
| Conditioning Time | min | 3 |
| Paddle Frequency | sec | 15 |
| Air flow | L/min | 0-3 mins: 1.5<br>3-10 mins: 2.5<br>10-16 mins: 4.0 |
| Extraction Times | min | 2 (first), 16 (second) |
| Water Type | — | Drinking water |
| Water temperature | ° C. | 20 (±1) |
| Collector 208* | (g/t) | 48 (Conditioning) |
| Collector 3894* | (g/t) | 24 (Conditioning) |
| Foaming D-400§ | (g/t) | 30 (Conditioning) |

*supplied by Solvay
§ supplied by Dow Chemicals

Detail of Work Protocol

1.1 Mechanical Preparation

An ore sample containing 1.93% copper (of which, 0.261% was oxidized copper) and 1.0 g/t gold was ground to a granulometry of 100% through a 10 mesh (2000 µm) according to ASTM E11-20. Subsequently, the sample was homogenized and fractionated in a pro-splitter cutter ("carousel"), to generate the packages for the grinding and flotation tests.

1.2 Mineralogical Analysis

The following mineralogical species were observed, listed in order of relative abundances
Majority: magnetite
In smaller quantities: pyrite, chalcopyrite, hematite, bornite
Minority: digenite, coveline, chalcosine, tenantite-tetrahedrite
In traces: limonite, galena, sphalerite, native Cu, marcasite, pyrrhotine
Summary Table of Mineralogical Compositions (Expressed in % Weight):

| SPECIES | | FORMULA |
|---|---|---|
| Cu sulfides | | |
| Chalcopyrite | 4.31 | $CuFeS_2$ |
| Calcosine | 0.13 | $Cu_2S$ |
| Digenite | 0.16 | $Cu_9S_5$ |
| Covelina | Tr (1) | CuS |
| Bornite | 0.18 | $Cu_5FeS_4$ |
| Native Copper | Tr (1) | Cu |
| Other sulfides | | |
| Pyrita | 2.09 | $FeS_2$ |
| Molybdenite | 0.02 | $MoS_2$ |
| Sphalerite | Tr (1) | (Zn, Fe)S |
| Galena | Tr (1) | PbS |
| Marcasita | Tr (1) | $FeS_2$ |
| Pirrotin | Tr (1) | FeS |
| Metal oxides | | |
| Magnetite | 33.24 | $Fe^{2+}Fe^{3+}_2 O_4$ |
| Hematite | 0.62 | $Fe_2O_3$ |
| Limonite | 0.06 | $FeO(OH)_n H_2O$ |
| Rutile | 0.04 | $TiO_2$ |
| Non-metallic minerals (gangue) | 59.16 | Indeterminate |
| TOTAL | 100 | |

(1) trace mineral that cannot be quantified

As can be seen from this summary table, for copper, i.e., the useful species in this example, the mineral is mainly made up of primary sulfides. It was not possible to observe gold particles under the light microscope. This is attributed to the too low grade (1.0 g/t Au).

1.3 Rougher Flotation Kinetics Tests 1.3.1 10 kg of single size 1-inch steel ball grinding elements were deposited in a laboratory batch mill and drinking water was added in an amount sufficient to obtain the 66.67% of solids required for grinding. The mineral was then loaded (at a load of 1000 g) into the mill and ground to obtain a grain size of 70% through a 200 mesh (ASTM E11-20). (Mill Addition Summary:mineral=1000 g; water=500 mL).

1.3.2 The pulp (the mixture of ground mineral and water) was deposited in an Agitair flotation cell with a volume of 2.7 L. Drinking water was added to adjust the pulp to 30% solids and the pH was measured (natural value, pH 8). The flotation machine was then started (or energized) to stir the pulp, and 48 g/t collector 208, 24 g/t collector 3894, and 30 g/t foaming agent was added.

The pulp was conditioned for 3 minutes without injection of air. After the pulp conditioning stage, extraction of the foam was begun with 4 paddles per minute (frequency every 15 seconds), making sure to cover the entire flotation surface. The concentrates were obtained in separate containers (trays) and identified as "2 minutes" and "16 minutes". The entire test was carried out at room temperature (20±1° C.).

In the case of the tests with sulfidizing agents, at 2 minutes of flotation (after the first concentrate had been extracted), 130.6 g/t of sulfidizing agent was added, which comprised a mixture of $Na_2S_4$ and NaSH in a weight ratio of 1:1. After 30 seconds of airless conditioning, the concentrate extraction was continued.

1.3.3 The rougher concentrates and rougher tailings were then collected, filtered, dried and cooled, before being prepared mechanically (100% through 140 mesh-105 µm) for chemical analysis according to the usual procedure for such activities (detailed below).

1. Pressure filter the concentrates and tailings in pressure filter equipment (drum);
2. Transfer each filtered solid to a tray and dry in an oven at 100±5° C.;
3. Weigh dry concentrates and tailings and, by weight difference, obtain the recovered mass;
4. Transfer the tailings to a rolling cloth and disaggregate with a roller to homogenize;
5. Divide the tailings and obtain a sample for chemical and control tests;
6. Pulverize (100% through 140 mesh) samples of tailings and concentrates for chemical tests.

1.3.4 The chemical composition of the head ore, concentrates and tailings was established by determining total Cu, Au, and soluble (oxidized) Cu. The elements Cu and Ag were determined by Atomic Absorption Spectroscopy Method (using an Atomic Absorption Spectrophotometer). Au was tested by Fire Refining Method (Docimasia), using an oven. Soluble Cu was obtained by the Attack Method with Citric Acid (using Atomic Absorption Spectroscopy).

The same test was performed using no sulfidizing agent, and the results of each test are summarized in Table 1.

TABLE 1

Results of metal recovery tests with and without sulfidizing agent of present disclosure

| Sulfidizing agent | Recovery (%) | | |
|---|---|---|---|
| | Total copper | Oxidized copper | Gold |
| $Na_2S_4$/NaSH (1:1) | 94.03 | 75.39 | 93.47 |
| None | 88.28 | 48.83 | 91.51 |

The results show that use of a sulfidizing agent comprising a mixture of $Na_2S_4$ and NaSH in a weight ratio of 1:1 increases total copper and total gold recovery from the mineral sample. A significant improvement is also seen in the recovery of the soluble (i.e., oxidised) copper.

Figure 1:
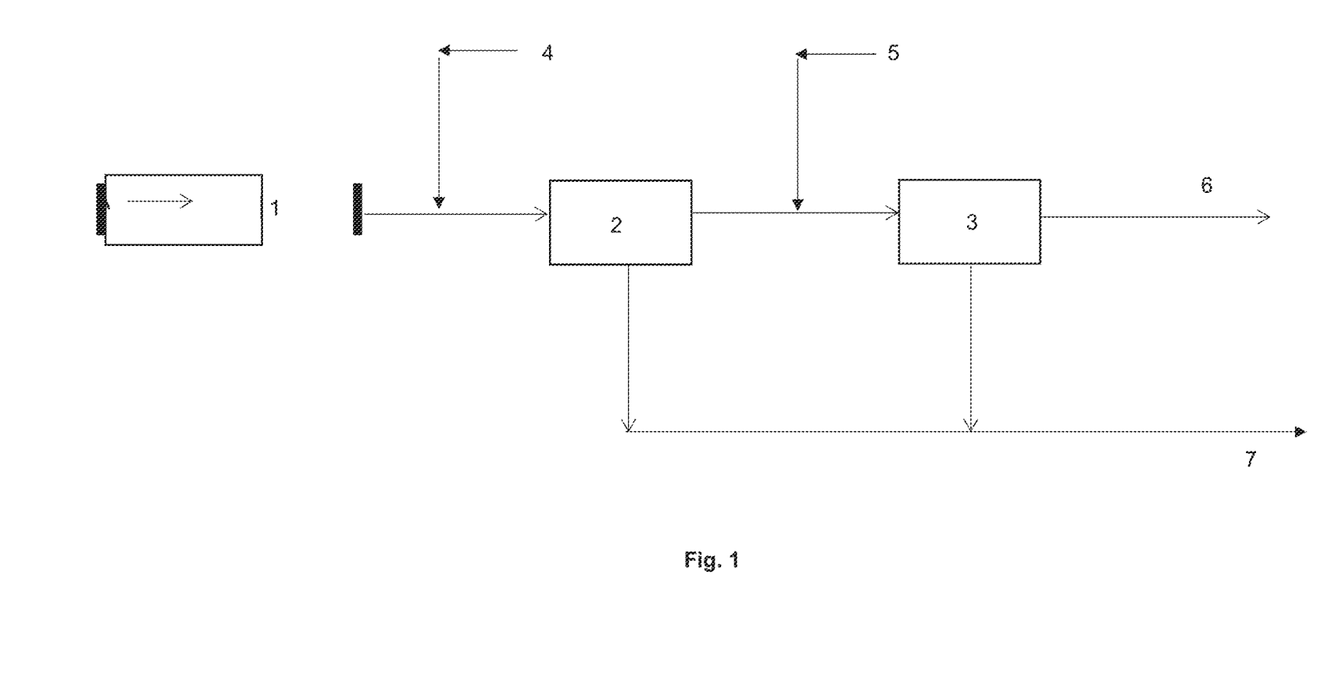
FIG. 1 is a schematic of the flotation steps performed, and the different fractions collected, in Example 1 and Example 4.

In FIG. 1, the flotation process performed, and the different fractions collected, are illustrated schematically. Here: A is the pulp feed, 1 is the mill, 2 and 3 are rougher floatation cells, 4 is the conditioning stage, where 48 g/t collector 208, 24 g/t collector 3894 and 30 g/t foaming agent are added (pH 8.0; 30 wt % solids), 5 is at a flotation time of 2 minutes, where 65.3 g/t $Na_2S_4$ and 65.3 g/t NaSH is added, 6 is the rougher tailings and 7 is the rougher concentrate.

Example 2: Recovery of Copper and Molybdenum from Mineral Sample of Valparaiso Region, Chile Example 2 was performed using a mineral sample with the following composition:

| Sample | Total copper (%) | Oxidized copper (%) | Solubility ratio (%) | Mo (%) | Fe (%) |
|---|---|---|---|---|---|
| Example 2 | 0.55 | 0.133 | 23.63 | 0.0092 | 4.35 |

The Standard Flotation Protocol used was as follows:

| Parameter | Unit | |
|---|---|---|
| Flotation Machine | — | Denver |
| Cell volume | L | 4.0 |
| Agitation | rpm | 1000 |
| Percentage of Solids | % | 35 |
| pH Flotation | — | 10.50 (with calcium oxide) |
| Feed granulometry | | $P_{80}$ = 250 µm (80% through 250 µm sieve) |
| Conditioning Time | min | 3 |
| Paddle Frequency | sec | 15 |
| Air flow | L/min | 10 |
| Water temperature | ° C. | 20 (±1) |
| Extraction Times | min | 0.5, 1, 3, 4, 7, 10.5, 15 |
| Water Type | | Process water |
| Diesel | (g/t) | 12 |
| Collector Hostaflot-7169[δ] | (g/t) | 24 total<br>60% at conditioning<br>40% at flotation = 4 mins (30 sec without air, 30 sec with air) |
| Foaming MatFroth-50[¥] | (g/t) | 24 total<br>60% at conditioning<br>40% at flotation = 4 mins (30 sec without air, 30 sec with air) |

[δ]supplied by Clariant;
[¥]supplied by Mathiesen

Detail of Work Protocol 2.1 Mechanical Preparation

A mineral sample containing 0.55% copper (of which, 0.133% was oxidized copper) and 0.0092% Mo was ground to a grain size of 100% through a 10 mesh (2000 µm) ASTM E11-20. Subsequently, the sample was homogenized and fractionated in a pro-splitter cutter ("carousel"), to generate the packages for the grinding and flotation tests.

2.2 Mineralogical Analysis

The following mineralogical species were observed:

Summary Table of Mineralogical Compositions

| Mineral | Wt % @ 250 µm granularity |
|---|---|
| Chalcocite | 0.19 |
| Covellite | 0.06 |
| Chalcopyrite | 1.03 |
| Bornite | 0.05 |
| Enargite/Tennantite | 0.00 |
| Native Copper | 0.00 |
| Cuprite/Tenorite | 0.00 |
| Malachite/Azurite | 0.00 |
| Brochantite | 0.01 |
| Atacamite | 0.00 |
| Turquoise | 0.00 |
| Pseudomalachite | 0.00 |
| Cu—Mn Wad | 0.00 |
| Chrysocolla/dioptase | 0.05 |
| Cu-bearing Clays | 0.01 |
| Cu-bearing Fe Ox/OH | 0.01 |
| Other Cu Mins | 0.01 |
| Pyrite | 2.01 |
| Galena | 0.00 |
| Sphalerite | 0.01 |
| Molybdenite | 0.01 |
| Fe Oxides | 3.32 |
| Ilmenite | 0.44 |
| Rutile | 0.50 |
| Corundum | 0.00 |
| Quartz | 38.94 |
| Orthoclase | 5.51 |

-continued

| Mineral | Wt % @ 250 μm granularity |
|---|---|
| Albite | 6.64 |
| Plagioclase | 1.53 |
| Muscovite/Sericite | 29.78 |
| Kaolinite | 0.56 |
| Pyrophyllite/Smectite | 0.28 |
| Biotite | 1.18 |
| Chlorite | 6.86 |
| Hornblende | 0.22 |
| Calcite/CO3 | 0.00 |
| Gypsum/Anhydrite | 0.03 |
| Alunite | 0.02 |
| Jarosite | 0.03 |
| Mg—SO4 | 0.00 |
| Barite | 0.01 |
| Svanbergite | 0.00 |
| Fe—Al—PO4 | 0.01 |
| Apatite | 0.37 |
| Monazite | 0.01 |
| Zircon | 0.01 |
| Others | 0.27 |
| Total | 100.00 |

As can be seen from this summary table, for copper, i.e., the useful species in this example, the mineral is mainly made up of chalcopyrite (that is, primary sulfide, 58.20%), with minor fractions of chalcosine, covelin and bornite (secondary sulfides, 35.57%). The rest of the copper is found in oxidized species (cuprite/tenorite, malachite/azurite, chrysocolla/dipotase, brochantite). The copper containing species are further detailed below.

Cu containing species (expressed in % weight of total copper containing species):

| Copper mineral | Wt % @ 250 μm granularity |
|---|---|
| Chalcocite | 24.09 |
| Covellite | 6.75 |
| Chalcopyrite | 58.20 |
| Bornite | 4.73 |
| Enargite/Tennantite | 0.01 |
| Native Copper | 0.24 |
| Cuprite/Tenorite | 0.63 |
| Malachite/Azurite | 0.18 |
| Brochantite | 0.83 |
| Atacamite | 0.01 |
| Turquoise | 0.00 |
| Pseudomalachite | 0.04 |
| Cu—Mn Wad | 0.01 |
| Chrysocolla/dioptase | 3.14 |
| Cu-bearing Clays | 0.23 |
| Cu-bearing Fe Ox/OH | 0.14 |
| Other Cu Mins | 0.53 |
| Others | 0.25 |
| Total | 100.00 |

2.3 Rougher Flotation Kinetics Tests 2.3.1 10 kg of single size 1-inch steel ball grinding elements were loaded into a laboratory batch mill and drinking water was added in an amount sufficient to obtain the 66.67% of solids required for grinding. The mineral was then loaded (at a load of 1800 g) into the mill and ground to obtain a granularity of $P_{80}$=250 μm. (Mill Addition Summary:mineral=1800 g; water=900 mL).

2.3.2 The pulp (the mixture of ground mineral and water) was loaded in a Denver flotation cell with a volume of 4.0 L, then process water was added to adjust to 35% solids and the pH (natural value) was measured.

Details of the rougher floatation process are as follows (the entire test is carried out at room temperature (20±1° C.)):
a) Start pulp stirring in flotation cell (15-30 seconds);
b) Measure pH of the pulp and adjust to 10.5 using 12% calcium hydroxide;
c) Add 14.4 g/t foaming agent Matfroth 50 (60% of a total dose of 24 g/t), 14.4 g/t Hostaflot-7169 collector (60% of a total dose of 24 g/t) and 12 g/t diesel oil;
d) Condition the pulp for 2 minutes without injection of air and for 1 minute with air injection;
e) After conditioning stage, start extraction of the foam with 4 paddles, making sure to cover the entire flotation surface. Taking the first sample sweep should be considered as "0 min";
f) Continue with foam extraction with 4 paddles every 15 seconds and obtain concentrates in separate containers for the 0.5-1-3 minute extractions;
g) Continue with extraction of the sample with paddles every 15 seconds between 3 and 4 minutes;
h) Cut air injection at minute 4 from the start of the floatation test;
i) Add the remaining 40% dose of Matfroth 50 foaming agent and remaining 40% dose of Hostaflot-7169 collector;
j) Condition the pulp for 30 seconds without injection of air and with air injection for 30 seconds;
k) Restart sample extraction with paddles every 15 seconds and obtain concentrates in separate containers after 4-7-10.5-15 minute extractions. Making sure to cover the entire floatation surface. Taking the first sample sweep should be considered as "0 min" of this second float stage.

In the case of tests with sulfidizing agents, at 4 minutes of flotation (after the first concentrate had been extracted), 27.5 g/t of sulfidizing agent was added (i.e., in step i) above), comprising a mixture of $Na_2S_4$ and NaSH in a weight ratio of 1:1. After 30 seconds conditioning without air, and 30 seconds with air, the concentrate extraction was continued. A similar procedure occurred at 7 minutes of flotation, with a re-addition of the sulfidizing agent.

2.3.3 The concentrates and tailings were then collected, filtered, dried and cooled, before being prepared mechanically (100% through 140 mesh-105 μm) for chemical analysis according to the usual procedure for such activities (described below).
1. Pressure filter the concentrates and tailings obtained, in pressure filter equipment (drum);
2. Transfer each filtered solid to a tray and dry in an oven at 100±5° C.;
3. Weigh dry concentrates and tailings and, by weight difference, obtain the recovered mass;
4. Transfer the tailings to a rolling cloth and disintegrate with a roller to homogenize;
5. Divide the tailings and obtain a sample for chemical and control tests;
6. Pulverize (100% through 140 mesh) samples of tailings and concentrates for chemical tests.

2.3.4 The chemical composition of the head ore, concentrates and tailings was established by determining total Cu, Fe, Mo and soluble (oxidized) Cu. The elements Cu, Fe and Mo were determined by Atomic Absorption Spectroscopy Method (using an Atomic Absorption Spectrophotometer). Soluble Cu was obtained by the Attack Method with Citric Acid (using Atomic Absorption Spectroscopy).

2.4 Cleaner Flotation Kinetics Tests

2.4.1 Rougher Flotations to Generate Rougher Concentrate

To obtain sufficient mass of rougher concentrate to allow the cleaner flotation kinetic test to be carried out, 3× rougher floatation were carried out, at a total time of 15 minutes, and the rougher concentrates generated in the tests were combined.

2.4.2 Rougher Concentrate Re-Grinding 10 kg of single size 1-inch steel ball grinding elements were loaded into a laboratory batch mill and the rougher concentrate pulp was added and drained to obtain the 50% solids required for grinding. The rougher concentrate pulp was then re-ground to obtain a granulation of $P_{80}$=44 μm. (Summary of pulp addition to the mill:rougher concentrate=235 g approx. (dry base); water=1071 mL).

2.4.3 The pulp (the mixture of ground rougher concentrate and water) was deposited in a Denver flotation cell with a volume of 1.15 L, and process water was added to adjust to 18% solids. Then the pH was measured.

Details of the cleaner floatation process are as follows (the entire test is carried out at room temperature (20±1° C.)):
Start pulp agitation in flotation cell (15-30 seconds);
Measure pH of the pulp and adjust to 11.0 using 12% calcium hydroxide;
Add 1.12 g/t Matfroth 50 foaming agent and 0.9 g/t Hostaflot-7169 collector;
Condition the pulp for 30 seconds without injection of air and for 30 seconds with air injection;
After the conditioning stage, begin extraction of the foam with 4 paddles, making sure to cover the entire flotation surface. Taking the first sample sweep should be considered as "0 min";
Continue with foam extraction with 4 paddles every 10 seconds and obtain concentrates in separate containers for the 0.5-1-3-6 min extractions;
Continue with sample extraction with paddles every 15 seconds;
Cut air injection at minute 12 from the start of the float test;
Add 1.12 g/t Matfroth 50 foaming agent;
Condition the pulp for 30 seconds without injection of air and with air injection for 30 seconds;
Restart sample extraction with paddles every 10 seconds and obtain concentrates in separate containers for 12-18-30 min extractions making sure to cover the entire floatation surface. Taking the first sample sweep should be considered as "0 min" of this second floatation stage.

In the case of the tests with sulfidizing agents, at 12 minutes of flotation (after extraction of the first concentrate), 4.0 g/t of sulfidizing agent was added, comprising a mixture of $Na_2S_4$ and NaSH in a weight ratio of 1:1. After 30 seconds conditioning without air, and 30 seconds with air, the concentrate extraction was continued. A similar procedure occurred at 18 minutes of flotation, with re-addition of the sulfidizing agent.

2.4.4 The cleaner concentrate, cleaner tailings and rougher tailings were then collected, filtered, dried and cooled, before being mechanically prepared (pulverization to get 100% through 140 mesh-105 μm) for chemical analysis according to the usual procedure for such activities (described in 2.3.3 above).

2.4.5 The chemical composition of the head ore, concentrates and tailings was established by determining total Cu, Fe, Mo and soluble (oxidized) Cu. The elements Cu, Fe and Mo were determined by Atomic Absorption Spectroscopy Method (using an Atomic Absorption Spectrophotometer). Soluble Cu was obtained by the Attack Method with Citric Acid (using Atomic Absorption Spectroscopy).

The same tests were performed using no sulfidizing agent or using NaSH as the sole sulfidising agent, and the results of each test are summarized in Table 2.

TABLE 2

Results of metal recovery tests with sulfidizing agent of present disclosure, NaSH or none

| Sulfidizing agent | Recovery (%) | | |
|---|---|---|---|
| | Total copper | Oxidized copper | Molybdenum |
| $Na_2S_4$/NaSH (1:1) | 78.19 | 54.35 | 50.63 |
| NaSH | 73.50 | 46.87 | 48.47 |
| None | 64.17 | 35.87 | 48.09 |

The results show that use of a sulfidizing agent comprising a mixture of $Na_2S_4$ and NaSH in a weight ratio of 1:1 increases total copper and total molybdenum recovery from the mineral sample compared to using NaSH alone. A significant improvement is also seen in the recovery of the soluble (i.e., oxidised) copper.

Figure 2:
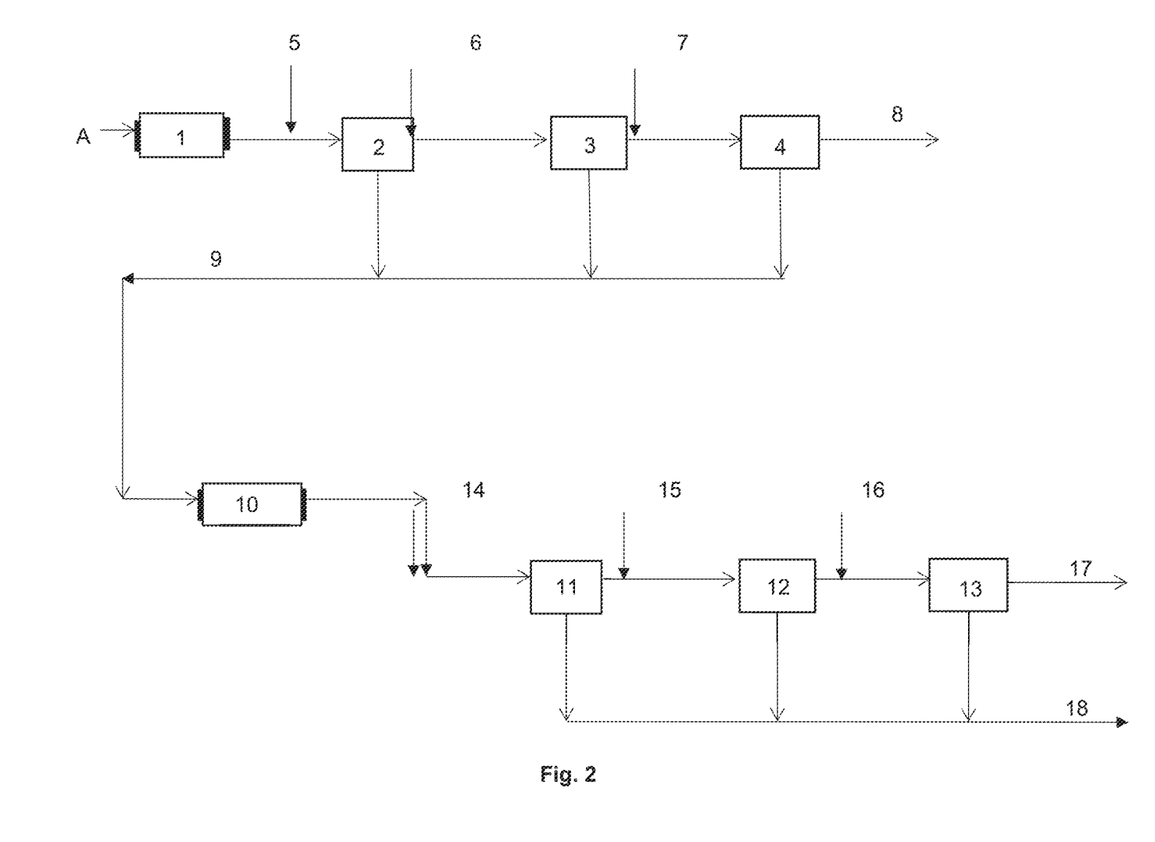
FIG. 2 is a schematic of the flotation steps performed, and the different fractions collected, in Example 2.

In FIG. 2, the flotation process performed, and the different fractions collected, are illustrated schematically. Here: A is the pulp feed, 1 is the mill, 2, 3 and 4 are rougher floatation cells, 5 is the conditioning stage, where 14.4 g/t Hostaflot-7169, 14.4 g/t Matfroth 50 and 12 g/t diesel oil are added (pH 10.5, with lime), 6 is at a flotation time of 4 minutes, where 9.6 g/t Hostaflot-7169, 9.6 g/t Matfroth 50, 13.75 g/t $Na_2S_4$ and 13.75 g/t NaSH is added, 7 is at a flotation time of 7 minutes, where 13.75 g/t $Na_2S_4$ and 13.75 g/t NaSH is added, 8 is the rougher tailings, 9 is the rougher concentrate, 10 is the mill for re-grinding the rougher concentrate, 11, 12 and 13 are cleaner floatation cells, 14 is the cleaner conditioning stage, where 0.9 g/t Hostaflot-7169 and 1.12 g/t Matfroth 50 is added (pH 11.0, with lime), 15 is at a flotation time of 12 minutes, where 1.12 g/t Matfroth 50, 2 g/t $Na_2S_4$ and 2 g/t NaSH is added, 16 is at a flotation time of 18 minutes, where 2 g/t $Na_2S_4$ and 2 g/t NaSH is added, 17 is the cleaner tailings and 18 is the cleaner concentrate.

Figure 3A:
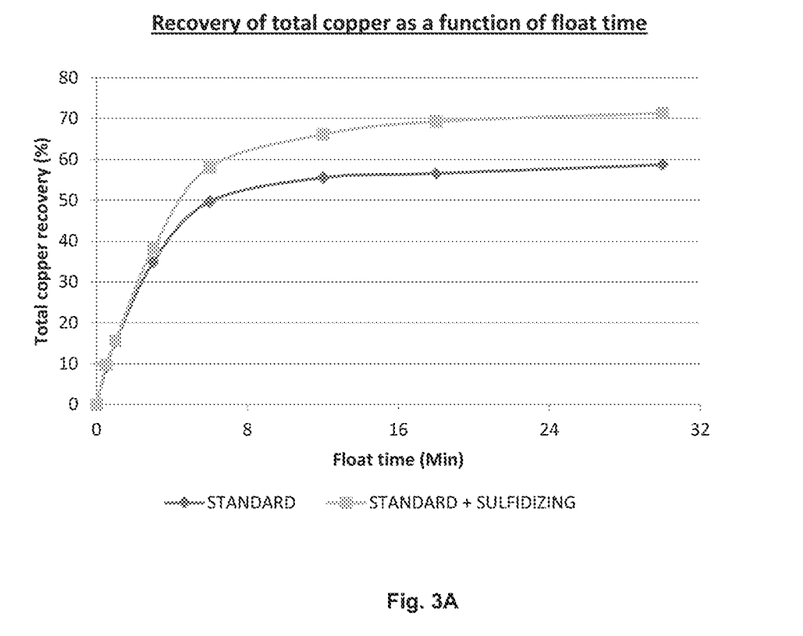
FIG. 3A shows the results of the flotation kinetic tests of Example 2, when using a sulfidizing agent comprising a mixture of $Na_2S_4$ and NaSH in a weight ratio of about 1:1 as compared to using no sulfidizing agent and more specifically total copper recovery.
Figure 3B:
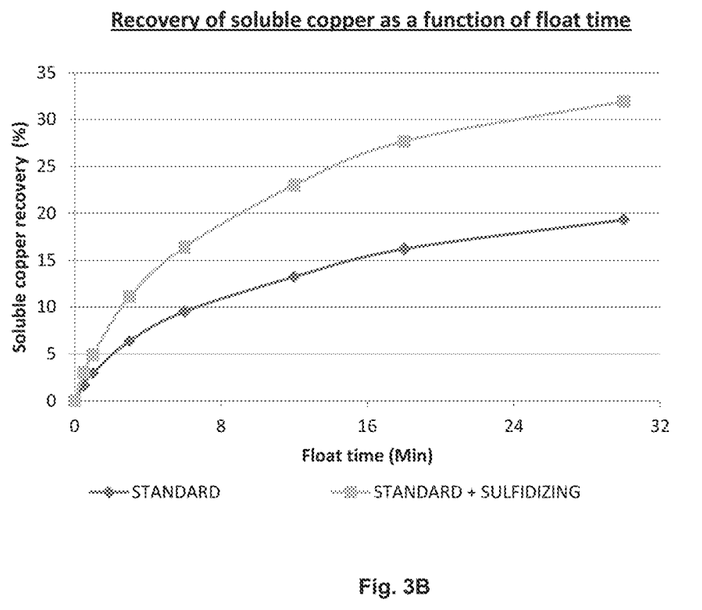
FIG. 3B shows the results of the flotation kinetic tests of Example 2, when using a sulfidizing agent comprising a mixture of $Na_2S_4$ and NaSH in a weight ratio of about 1:1 as compared to using no sulfidizing agent and more specifically oxidized copper recovery.

The flotation kinetics for total copper recovery and soluble (i.e., oxidized) copper recovery when using a sulfidizing agent comprising a mixture of $Na_2S_4$ and NaSH in a weight ratio of 1:1 ("STANDARD+SULFIDIZING") as compared to using no sulfidizing agent ("STANDARD") are shown in FIG. 3.

Example 3: Recovery of Copper and Silver from Mineral Sample of Cuzco Region, Peru A mineral sample containing 0.452% copper (of which, 0.121% is oxidized copper) and 3.505 ppm silver was ground to a desirable flotation size. The sample was then placed into a Denver flotation cell and mixing started. The sample was then conditioned with a collector and foaming agent.

After the conditioning steps, water was added to obtain a total pulp volume of 2.3 L having 35% solids and a pH of 10.5, and the flotation was started. The rougher flotation was performed at RT (20±1° C.) with 1,150 rpm agitation.

After a slight delay, sulfidizing agent comprising a mixture of $Na_2S_4$ and NaSH in a weight ratio of 70:30 was added to the flotation cell.

The rougher flotation was followed by two cleaning steps. The concentrate was collected and analyzed.

The process was performed using different doses of the sulfidizing agent. The recovery results are summarized in Table 3.

TABLE 3

Results of metal recovery tests with different doses of sulfidizing agent

| Test | $Na_2S_4$/NaSH (70:30) (g/ton dry mineral) | Recovery (%) Copper | Silver | Obtained copper concentrate (%) |
|---|---|---|---|---|
| 3.1 | 0 | 60.50 | 16.10 | 5.5 |
| 3.2 | 15 | 70.00 | 23.00 | 6.7 |
| 3.3 | 30 | 79.30 | 20.20 | 5.7 |

The results show that notable improvements in copper and silver recovery were obtained with doses much lower than those required when using NaSH as the sulfidizing agent (i.e. >100 g/ton dry mineral). This is believed to be due to the higher amounts of sulfur in the formulation.

The concentrations of copper concentrate obtained in tests 3.2 and 3.3 were also higher than that of Test 3.1. This means that the sulfidizing agent of the disclosure obtains a final copper product of better quality (i.e., more concentrated).

Test 3.2 was repeated, but an initial and additional dosage of 15 g/ton dry mineral of the sulfidizing agent was added in the milling step. The yield of total copper extraction was 59.1%. This result is worse than Test 3.2 and supports the dosing regimen of the preferred embodiments, i.e., only after the flotation process has started and in more advance stages of flotation and subsequent cleaners, to improve extractive yields. It is believed that dosing at these points is advantageous since the oxide ores are being concentrated in the cell as the flotation begins. Additionally, it has been found that the depressant power of the NaSH in the sulfidizing agent mixture competes with the sulfidizing power (resulting in an undesired effect) if the addition is made to early in the process.

Example 4: Recovery of Copper and Silver from Mineral Sample of Antofagasta Region, Chile Example 4 was performed using a mineral sample with the following composition:

| Sample | Total copper (%) | Oxidized copper (%) | Solubility ratio (%) | Ag (%) | Fe (%) |
|---|---|---|---|---|---|
| Example 4 | 0.642 | 0.093 | 14.49 | 0.0006 | 4.03 |

The Standard Flotation Protocol was as follows:

| Parameter | Unit | |
|---|---|---|
| Flotation Machine | — | Wenco type |
| Cell volume | L | 2.8 |
| Agitation | rpm | 1200 |
| Percentage of Solids | % | 38 |
| Flotation pH | — | 10.00 (with calcium oxide) |
| Feed granulometry | — | $P_{80}$ = 260 μm (80% through 260 μm sieve) |
| Conditioning Time | min | 2 |
| Paddle Frequency | sec | 10 |
| Air flow | L/Min | 10 |
| Extraction Times | min | Standard: 1, 5, 15, 30 |
| Water Type | — | Process water |
| Water temperature | ° C. | 20 (±1) |
| Collector Mated AP-7156[¥] | (g/t) | 25 (Milling) |
| Collector MX-3753* | (g/t) | 15 (Conditioning) |
| Foaming MB-78* | (g/t) | 20 (Conditioning) |
| Foaming MIBC* | (g/t) | 15 (Conditioning) |

[¥]supplied by Mathiesen;
*supplied by Solvay

Detail of Work Protocol

Mechanical Preparation

A mineral sample containing 0.642% copper (of which, 0.093% was oxidized copper) and 0.0006% silver was ground to a granulometry of 100% through a 10 mesh (2000 μm) according to ASTM E11-20. Subsequently, the sample was homogenized and fractionated in a Pro-Splitter cutter ("carousel"), to generate the packages for the grinding and flotation tests.

4.2 Rougher Flotation Kinetics Tests 4.2.1 10 kg of single size 1-inch steel ball grinding elements were loaded into a laboratory batch mill and process water was added in an amount sufficient to obtain the 66.67% of solids required for grinding. The mineral (at a load of 1000 g) and the collecting reagent AP-7156 (0.025 g) were then loaded into the mill and ground to obtain a granularity of $P_{80}$=250 μm. (Mill Addition Summary: mineral=1000 g; collecting reagent AP-7156=0.025 g; water=500 mL).

4.2.2 The pulp (the mixture of ground mineral, collecting agent AP-7156 and water) was loaded in a Wenco flotation cell with a volume of 4.0 L, then process water was added to adjust to 38% solids and the pH (natural value, of the order of 8) was measured.

Details of the rougher floatation process are as follows (the entire test is carried out at room temperature (20±1° C.):
a) Start pulp stirring in flotation cell (15-30 seconds);
b) Measure pH of the pulp and adjust to 10 using 12% calcium oxide;
c) Add 15 g/t collector MX-3753, 20 g/t foaming agent MB-78 and 15 g/t foaming agent MIBC;
d) Condition the pulp for 2 minutes without injection of air;
e) After conditioning stage, start extraction of the foam with 6 paddles, making sure to cover the entire flotation surface; Taking the first sample sweep should be considered as "0 min";
f) Continue with foam extraction with 6 paddles every 60 seconds and obtain concentrates in separate containers for the 1-5-15-30 minute extractions;
g) Stop floatation process and thoroughly wash all parts (agitator, sample extraction paddle, etc.) to ensure that all solid material is contained in the resulting pulp within the flotation cell.

4.2.3 In the case of tests with sulfidizing agents: at 7 minutes of flotation (after the first 2 concentrates had been extracted), sulfidizing agent was added in accordance with Table 4. After 30 seconds conditioning without air, and 30 seconds with air, the concentrate extraction was continued.

4.2.4 The concentrates and tailings were then collected, filtered, dried and cooled, before being prepared mechanically (100% through 140 mesh-105 µm) for chemical analysis according to the usual procedure for such activities (described below).

1. Pressure filter the concentrates and tailings obtained, in pressure filter equipment (drum);
2. Transfer each filtered solid to a tray and dry in an oven at 100±5° C.;
3. Weigh dry concentrates and tailings and, by weight difference, obtain the recovered mass;
4. Transfer the tailings to a rolling cloth and disintegrate with a roller to homogenize;
5. Divide the tailings and obtain a sample for chemical and control tests;
6. Pulverize (100% through 140 mesh) samples of tailings and concentrates for chemical tests.

4.2.5 The chemical composition of the head ore, concentrates and tailings was established by determining total Cu and soluble Cu (oxidized). The element Cu was determined by Atomic Absorption Spectroscopy Method (using Atomic Absorption Spectrophotometer). Soluble Cu was obtained by the Attack Method with Citric Acid (using Atomic Absorption Spectroscopy).

The same test was performed using no sulfidizing agent, or using NaSH as the sole sulfidising agent, and the results of each test are summarized in Table 4.

TABLE 4

Results of metal recovery tests with sulfidizing agent of present disclosure, NaSH or none

| Sulfidizing agent | Dosage (g/t) | Recovery (%) | |
|---|---|---|---|
| | | Total copper | Oxidized copper |
| None | — | 84.67 | 45.90 |
| $Na_2S_4$/NaSH (1:1) | 70 | 90.53 | 82.93 |
| $Na_2S_4$/NaSH (3:7) | 70 | 90.38 | 76.14 |
| NaSH | 70 | 89.61 | 74.77 |
| $Na_2S_4$/NaSH (1:1) | 35 | 89.88 | 80.35 |

The results show that the use of a sulfidizing agent comprising a mixture of $Na_2S_4$ and NaSH in a weight ratio of 1:1 and 3:7 increases the recovery of total copper recovery from the mineral sample compared to using no sulfidizing agent or NaSH alone. A significant improvement is also seen in the recovery of soluble (oxidized) copper. It is also seen in the last row, that a dosage of a mixture of $Na_2S_4$ and NaSH in a weight ratio of 1:1, which is 50% of the NaSH dose, still shows better performance than NaSH alone.

In FIG. 1, the flotation process performed in Example 4, and the different fractions collected, are illustrated schematically. Here: A is the mill feed, 1 is the mill, 2 and 3 are rougher floatation cells, 4 is the conditioning stage, where 15 g/t collector MX-3753, 20 g/t foaming agent MB-78 and 15 g/t foaming agent MIBC are added (pH 10.0; 38 wt % solids), 5 is at a flotation time of 7 minutes, where $Na_2S_4$ and/or NaSH is added, 6 is the rougher tailings and 7 is the rougher concentrate.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than to mean 'consisting of'. All prior teachings acknowledged above are hereby incorporated by reference in various non-limiting embodiments. No acknowledgement of any prior published document herein should be taken to be an admission or representation that the teaching thereof was common general knowledge in Europe or elsewhere at the date hereof.

The above detailed description is merely exemplary in nature and is not intended to limit the current disclosure. Furthermore, there is no intention to be bound by any theory presented in the preceding background or detailed description.

In this disclosure, the terminology "about" can describe values ±0.1, 0.5, 1, 2, 3, 4, 5, 6, 7, 8, 9, or 10%, in various non-limiting embodiments. Moreover, it is contemplated that, in various non-limiting embodiments, all values set forth herein may be alternatively described as approximate or "about." It is contemplated that all isomers and chiral options for each compound described herein are hereby expressly contemplated for use herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A process for recovering one or more metal ores and/or polymetallic minerals from gangue, said process comprising:
    (i) treating the one or more metal ores and/or polymetallic minerals with a sulfidizing agent; and
    (ii) separating the treated metal ores and/or polymetallic minerals using a sulfide floatation process;
    wherein the sulfidizing agent is obtained by mixing $M_yS_x$ and ZSH in a weight ratio of from about 90:10 to about 10:90, wherein M is chosen from $Li^+$, $Na^+$, $K^+$, $Rb^+$, $Cs^+$, $NH_4^+$, $Mg^{2+}$ and $Ca^{2+}$, y is about 1 or about 2, x is from about 2.1 to about 5, and Z is independently chosen from $Li^+$, $Na^+$, $K^+$, $Rb^+$, $Cs^+$ and $NH_4^+$;
    wherein the treatment in (i) is performed by adding a first portion of sulfidizing agent to the one or more metal ores and/or polymetallic minerals in a rougher floatation stage of the sulfide floatation process and adding a further portion of sulfidizing agent to the one of metal ores and/or polymetallic minerals in at least one cleaning stage of the sulfide floatation process; and
    wherein the sulfidizing agent is added to the rougher floatation stage in an amount of from about 10 to about 70 g/ton and to the at least one cleaning stage in an amount of from about 3 to about 15 g/ton, based on a dose of grams of agent per ton of dry ore/dry mineral.

2. The process as claimed in claim 1, wherein x is from about 2.1 to about 4.5.

3. The process as claimed in claim 2, wherein M and/or Z is chosen from $Li^+$, $Na^+$, $K^+$, $Rb^+$ and $Cs^+$.

4. The process as claimed in claim 2, wherein the weight ratio $M_yS_x$ to ZSH is from about 90:10 to about 30:70.

5. The process as claimed in claim 2, wherein the sulfidizing agent comprises a dithiophosphate or a monothiophosphate-based collector and/or a polyglycol-based foaming agent.

6. The process as claimed in claim 2, wherein the one or more metal ores is chosen from ores of copper (Cu), molybdenum (Mo), gold (Au), silver (Ag), lead (Pb), Nickel (Ni) and Cobalt (Co) and/or the one or more polymetallic minerals is chosen from Cu—Mo, Cu—Au, Pb—Zn—Cu, Ag—Cu, Zn—Pb—Ag, Cu—Zn—Pb—Ag, Sn—Cu and Zn—Pb minerals.

7. The process as claimed in claim 2, wherein the sulfidizing agent is added to the rougher floatation stage after a delay of at least about 3 minutes after the flotation process begins.

8. The process as claimed in claim 2, wherein M and/or Z is $Na^+$.

9. The process as claimed in claim 1, wherein M and/or Z is chosen from $Li^+$, $Na^+$, $K^+$, $Rb^+$ and $Cs^+$.

10. The process as claimed in claim 1, wherein the weight ratio $M_yS_x$ to ZSH is from about 90:10 to about 30:70.

11. The process as claimed in claim 1, wherein the sulfidizing agent comprises a dithiophosphate or a monothiophosphate-based collector and/or a polyglycol-based foaming agent.

12. The process as claimed in claim 1, wherein the one or more metal ores is chosen from ores of copper (Cu), molybdenum (Mo), gold (Au), silver (Ag), lead (Pb), Nickel (Ni) and Cobalt (Co) and/or the one or more polymetallic minerals is chosen from Cu—Mo, Cu—Au, Pb—Zn—Cu, Ag—Cu, Zn—Pb—Ag, Cu—Zn—Pb—Ag, Sn—Cu and Zn—Pb minerals.

13. TheA process as claimed in claim 1, wherein the sulfidizing agent is added to the rougher floatation stage after a delay of at least about 3 minutes after the flotation process begins.

14. The process as claimed in claim 1, wherein M and/or Z is $Na^+$.

15. The process as claimed in claim 1, wherein the weight ratio $M_yS_x$ to ZSH is from about 90:10 to about 50:50.

16. The process as claimed in claim 1, wherein the weight ratio $M_yS_x$ to ZSH is from about 70:30 to about 50:50.

17. The process as claimed in claim 6 wherein the sulfidizing agent is for recovering copper, gold, silver, and/or molybdenum, and/or combinations thereof, from gangue, wherein the sulfidizing agent is obtained by mixing $M_yS_x$ and ZSH in a weight ratio of about 50:50, wherein M is $Na^+$, y is about 2, x is from about 1.2 to about 2.2, and Z is $Na^+$.

18. The process as claimed in claim 1, wherein:

x is from about 2.1 to about 4.5;

M and/or Z is chosen from $Li^+$, $Na^+$, $K^+$, $Rb^+$ and $Cs^+$ so long as at least one of M or Z is $Na^+$;

the weight ratio $M_yS_x$ to ZSH is from about 90:10 to about 30:70;

the sulfidizing agent comprises a dithiophosphate or a monothiophosphate-based collector and/or a polyglycol-based foaming agent;

the one or more metal ores is chosen from ores of copper (Cu), molybdenum (Mo), gold (Au), silver (Ag), lead (Pb), Nickel (Ni) and Cobalt (Co) and/or the one or more polymetallic minerals is chosen from Cu—Mo, Cu—Au, Pb—Zn—Cu, Ag—Cu, Zn—Pb—Ag, Cu—Zn—Pb—Ag, Sn—Cu and Zn—Pb minerals; and the sulfidizing agent is added to the rougher floatation stage after a delay of at least about 3 minutes after the flotation process begins.

* * * * *